United States Patent
Ellis et al.

(10) Patent No.: US 9,189,954 B2
(45) Date of Patent: Nov. 17, 2015

(54) ALTERNATE USER INTERFACES FOR MULTI TUNER RADIO DEVICE

(71) Applicant: 3D RADIO LLC, Boulder, CO (US)

(72) Inventors: Michael D. Ellis, Boulder, CO (US); Caron Schwartz, Boulder, CO (US)

(73) Assignee: 3D RADIO, LLC, Boulder, CO (US)

( * ) Notice: Subject to any disclaimer, the term of this patent is extended or adjusted under 35 U.S.C. 154(b) by 0 days.

(21) Appl. No.: 14/242,771

(22) Filed: Apr. 1, 2014

(65) Prior Publication Data

US 2014/0210588 A1   Jul. 31, 2014

Related U.S. Application Data

(63) Continuation of application No. 12/420,650, filed on Apr. 8, 2009, now Pat. No. 8,699,995.

(60) Provisional application No. 61/043,604, filed on Apr. 9, 2008.

(51) Int. Cl.
*H04M 1/66* (2006.01)
*G08C 19/00* (2006.01)
*G06F 3/0488* (2013.01)
*H04M 1/60* (2006.01)

(52) U.S. Cl.
CPC ............ *G08C 19/00* (2013.01); *G06F 3/04883* (2013.01); *G06F 3/04886* (2013.01); *H04M 1/6091* (2013.01)

(58) Field of Classification Search
CPC ...................... H04M 2250/12; H04M 2250/22
USPC ............. 455/410, 575.1, 414.3, 556.1, 422.1, 455/566
See application file for complete search history.

(56) References Cited

U.S. PATENT DOCUMENTS

| | | | |
|---|---|---|---|
| 2,097,901 A | 11/1937 | Thomas | 455/172.1 |
| 4,031,334 A | 6/1977 | Kimura et al. | 369/7 |
| 4,109,115 A | 8/1978 | Yamamoto | 369/7 |
| 4,268,724 A | 5/1981 | Hubbard | 369/7 |
| 4,591,661 A | 5/1986 | Benedetto et al. | 455/556.1 |
| 4,677,466 A | 6/1987 | Lert et al. | 725/22 |
| 4,682,370 A | 7/1987 | Matthews | 455/166 |
| 4,787,063 A | 11/1988 | Muguet | 386/299 |
| 4,953,212 A | 8/1990 | Otsubo | 381/1 |
| 5,119,507 A | 6/1992 | Mankovitz | 455/154.1 |
| 5,187,589 A | 2/1993 | Kono et al. | 386/83 |
| 5,214,792 A | 5/1993 | Alwadish | 455/45 |
| 5,239,540 A | 8/1993 | Rovira et al. | 370/345 |

(Continued)

FOREIGN PATENT DOCUMENTS

GB     2 313 216 A   11/1997
WO    WO 99/45700 A1   9/1999

(Continued)

OTHER PUBLICATIONS

Louderback, "Improve Your Commute with Audio on Demand," ZDTV, 'Online! (Nov. 10, 1999) (available at: http://www.zdnet.com/anchordesk/story/story_4066.html).

(Continued)

*Primary Examiner* — Linh Nguyen
(74) *Attorney, Agent, or Firm* — Winston & Strawn LLP

(57) ABSTRACT

A method, device, system, and media are directed to controlling a multi-tuner radio. A voice command may be received and/or filtered. An operation of the radio may be modified based on the voice command. A gesture input may be received through a gesture pad. Another operation of the multi-tuner radio may be modified based on the received gesture input. A fingerprint may be recognized with a gesture pad. A user may be authenticated based on the recognized fingerprint. The operation or the other operation may be personalized based on the fingerprint. User training may be provided for the gesture input.

27 Claims, 10 Drawing Sheets

(56) References Cited

U.S. PATENT DOCUMENTS

| | | | |
|---|---|---|---|
| 5,243,640 A | 9/1993 | Hadley et al. | 455/426.1 |
| 5,253,066 A | 10/1993 | Vogel | 725/28 |
| 5,345,430 A | 9/1994 | Moe | 369/7 |
| 5,371,551 A | 12/1994 | Logan et al. | 348/571 |
| 5,404,588 A | 4/1995 | Henze | 455/186.1 |
| 5,406,558 A | 4/1995 | Rovira et al. | 370/326 |
| 5,448,534 A | 9/1995 | Okada | 369/7 |
| 5,457,815 A | 10/1995 | Morewitz, II | 455/161.1 |
| 5,463,599 A | 10/1995 | Yifrach et al. | 369/7 |
| 5,513,385 A | 4/1996 | Tanaka | 455/228 |
| 5,612,729 A | 3/1997 | Ellis et al. | 725/22 |
| 5,671,195 A | 9/1997 | Lee | 269/7 |
| 5,742,893 A | 4/1998 | Frank | 455/66.1 |
| 5,774,798 A | 6/1998 | Gaskill | 455/186.1 |
| 5,778,137 A | 7/1998 | Nielsen et al. | 386/68 |
| 5,818,441 A | 10/1998 | Throckmorton et al. | 715/717 |
| 5,867,794 A | 2/1999 | Hayes et al. | 455/557 |
| 5,914,941 A | 6/1999 | Janky | 370/313 |
| 5,978,689 A | 11/1999 | Tuoriniemi et al. | 455/569.1 |
| 5,986,650 A | 11/1999 | Ellis et al. | 725/40 |
| 6,074,553 A | 6/2000 | Haski | 210/167.2 |
| 6,088,455 A | 7/2000 | Logan et al. | 380/200 |
| 6,134,426 A | 10/2000 | Volkel | 455/161.3 |
| 6,169,843 B1 | 1/2001 | Lenihan et al. | 386/46 |
| 6,209,787 B1 | 4/2001 | Iida | 235/381 |
| 6,212,359 B1 | 4/2001 | Knox | 725/135 |
| 6,233,389 B1 | 5/2001 | Barton et al. | 386/46 |
| 6,236,674 B1 | 5/2001 | Morelli et al. | 375/219 |
| 6,259,441 B1 | 7/2001 | Ahmad et al. | 345/720 |
| 6,275,268 B1 | 8/2001 | Ellis et al. | 348/564 |
| 6,282,464 B1 * | 8/2001 | Obradovich | 701/1 |
| 6,327,418 B1 | 12/2001 | Barton | 386/46 |
| 6,337,719 B1 | 1/2002 | Cuccia | 348/731 |
| 6,356,704 B1 | 3/2002 | Callway et al. | 386/94 |
| 6,400,996 B1 | 6/2002 | Hoffberg et al. | 700/83 |
| 6,407,750 B1 | 6/2002 | Gioscia et al. | 715/716 |
| 6,421,453 B1 | 7/2002 | Kanevsky et al. | 382/115 |
| 6,438,523 B1 * | 8/2002 | Oberteuffer et al. | 704/270 |
| 6,452,960 B1 | 9/2002 | Sato | 375/140 |
| 6,507,727 B1 | 1/2003 | Henrick | 455/3.06 |
| 6,564,003 B2 | 5/2003 | Marko et al. | 386/69 |
| 6,588,015 B1 | 7/2003 | Eyer et al. | 725/89 |
| 6,607,136 B1 | 8/2003 | Atsmon et al. | 235/492 |
| 6,630,963 B1 | 10/2003 | Billmaier | 348/515 |
| 6,658,247 B1 | 12/2003 | Saito | 455/412.1 |
| 6,710,815 B1 | 3/2004 | Billmaier et al. | 348/515 |
| 6,721,236 B1 | 4/2004 | Eschke et al. | 369/6 |
| 6,725,002 B2 | 4/2004 | Sakurai et al. | 399/111 |
| 6,725,022 B1 | 4/2004 | Clayton et al. | 455/154.1 |
| 6,769,028 B1 | 7/2004 | Sass et al. | 709/231 |
| 6,785,656 B2 | 8/2004 | Patsiokas et al. | 704/500 |
| 6,792,296 B1 | 9/2004 | Van Bosch | 455/569.2 |
| 6,829,475 B1 | 12/2004 | Lee et al. | 455/419 |
| 6,850,252 B1 | 2/2005 | Hoffberg | 715/9 |
| 6,895,165 B2 | 5/2005 | Boys | 386/263 |
| 6,931,451 B1 | 8/2005 | Logan et al. | 709/231 |
| 6,944,430 B2 | 9/2005 | Berstis | 455/186.1 |
| 6,952,576 B2 | 10/2005 | Fish et al. | 455/414.1 |
| 6,961,585 B2 | 11/2005 | Minematsu | 455/556.1 |
| 6,990,312 B1 | 1/2006 | Gioscia et al. | |
| 7,028,323 B2 | 4/2006 | Franken et al. | 725/9 |
| 7,058,376 B2 | 6/2006 | Logan et al. | 455/186.1 |
| 7,065,342 B1 | 6/2006 | Rolf | 455/412.1 |
| 7,095,688 B2 | 8/2006 | Kondo et al. | 369/47.33 |
| 7,107,063 B1 | 9/2006 | Bates et al. | 455/456.1 |
| 7,158,871 B1 * | 1/2007 | Ilan et al. | 701/49 |
| 7,171,174 B2 | 1/2007 | Ellis et al. | 455/132 |
| 7,177,608 B2 | 2/2007 | Herz et al. | 455/185.1 |
| 7,213,075 B2 | 5/2007 | Feig | 709/231 |
| 7,231,198 B2 | 6/2007 | Loughran | 455/343.2 |
| 7,277,562 B2 | 10/2007 | Zyzdryn | 382/124 |
| 7,295,904 B2 * | 11/2007 | Kanevsky et al. | 701/36 |
| 7,313,375 B2 | 12/2007 | Lee et al. | 455/186.1 |
| 7,327,859 B1 * | 2/2008 | Chau | 382/116 |
| 7,343,141 B2 | 3/2008 | Ellis et al. | 455/132 |
| 7,418,277 B2 | 8/2008 | Tsai | 455/569.2 |
| 7,474,773 B2 | 1/2009 | Chau | 382/124 |
| 7,627,560 B2 | 12/2009 | Watanabe et al. | 1/1 |
| 7,668,576 B2 | 2/2010 | Ellenbogen et al. | 455/575.1 |
| 7,742,458 B2 | 6/2010 | Sharma et al. | 370/347 |
| 7,937,119 B2 | 5/2011 | Arai | 455/574 |
| 8,165,644 B2 | 4/2012 | Syed | 455/474 |
| 8,411,606 B2 | 4/2013 | Chen et al. | 370/311 |
| 8,700,262 B2 * | 4/2014 | Boissonnier et al. | 701/41 |
| 8,706,023 B2 | 4/2014 | Ellis | |
| 8,706,169 B2 | 4/2014 | Cortright | |
| 2001/0047379 A1 | 11/2001 | Jun et al. | 709/1 |
| 2002/0045438 A1 | 4/2002 | Tagawa et al. | 455/412 |
| 2002/0049037 A1 | 4/2002 | Christensen et al. | |
| 2002/0057380 A1 | 5/2002 | Matey | 348/731 |
| 2002/0111703 A1 | 8/2002 | Cole | 700/94 |
| 2002/0174430 A1 | 11/2002 | Ellis et al. | 725/46 |
| 2002/0186957 A1 | 12/2002 | Yuen | 386/46 |
| 2003/0013425 A1 | 1/2003 | Nee | 455/186.1 |
| 2003/0095791 A1 | 5/2003 | Barton et al. | 386/83 |
| 2003/0163823 A1 | 8/2003 | Logan et al. | 725/89 |
| 2003/0208771 A1 | 11/2003 | Hensgen et al. | 725/100 |
| 2004/0029541 A1 | 2/2004 | Baranowski et al. | 455/130 |
| 2004/0128692 A1 | 7/2004 | Wolfe et al. | 725/89 |
| 2004/0158748 A1 | 8/2004 | Ishibashi et al. | 713/300 |
| 2004/0198282 A1 | 10/2004 | Heiderscheit et al. | |
| 2005/0005298 A1 | 1/2005 | Tranchina | 725/81 |
| 2005/0014495 A1 | 1/2005 | Shanahan | 455/419 |
| 2005/0020223 A1 | 1/2005 | Ellis et al. | 455/186.1 |
| 2005/0049750 A1 | 3/2005 | Parker et al. | 700/258 |
| 2005/0064835 A1 | 3/2005 | Gusler et al. | 455/245.1 |
| 2005/0085217 A1 * | 4/2005 | Lim | 455/410 |
| 2005/0229213 A1 | 10/2005 | Ellis et al. | 725/58 |
| 2006/0008243 A1 | 1/2006 | Przybylek | 386/46 |
| 2006/0026637 A1 | 2/2006 | Gatto et al. | 725/37 |
| 2006/0047386 A1 * | 3/2006 | Kanevsky et al. | 701/36 |
| 2006/0082690 A1 | 4/2006 | Englert | 348/731 |
| 2006/0083253 A1 | 4/2006 | Park et al. | 370/401 |
| 2006/0085115 A1 * | 4/2006 | Ilan et al. | 701/49 |
| 2006/0132382 A1 | 6/2006 | Jannard | |
| 2006/0149971 A1 | 7/2006 | Kozlay | 713/186 |
| 2007/0052686 A1 * | 3/2007 | Nomura | 345/173 |
| 2007/0064157 A1 | 3/2007 | Kasamatsu | 348/730 |
| 2007/0130280 A1 | 6/2007 | Park et al. | 709/208 |
| 2007/0273658 A1 * | 11/2007 | Yli-Nokari et al. | 345/173 |
| 2008/0027586 A1 | 1/2008 | Hern et al. | 700/284 |
| 2008/0045170 A1 | 2/2008 | Howley et al. | 455/186.1 |
| 2008/0111710 A1 * | 5/2008 | Boillot | 341/22 |
| 2008/0165758 A1 | 7/2008 | Kato et al. | 370/347 |
| 2008/0192994 A1 | 8/2008 | Chau | 382/124 |
| 2008/0204604 A1 | 8/2008 | Campbell | 348/731 |
| 2008/0320523 A1 | 12/2008 | Morris et al. | 725/47 |
| 2009/0174822 A1 | 7/2009 | Pugel | 348/731 |
| 2009/0313660 A1 | 12/2009 | Ni et al. | 725/78 |
| 2010/0120366 A1 | 5/2010 | DeBiasio et al. | 455/41.3 |
| 2012/0237092 A1 * | 9/2012 | Bechtel | 382/126 |
| 2013/0053007 A1 | 2/2013 | Cosman et al. | 455/414.3 |
| 2013/0242706 A1 * | 9/2013 | Newsome, Jr. | 367/197 |

FOREIGN PATENT DOCUMENTS

| | | |
|---|---|---|
| WO | WO 99/45701 A1 | 9/1999 |
| WO | WO 99/66725 A1 | 12/1999 |
| WO | WO 00/13415 A2 | 3/2000 |
| WO | WO 00/13416 A1 | 3/2000 |
| WO | WO 00/16548 A1 | 3/2000 |
| WO | WO 00/45511 A1 | 8/2000 |
| WO | WO 01/76248 A2 | 10/2001 |

OTHER PUBLICATIONS

International Search Report, Appl. No. PCT/US02/05039, Feb. 4, 2003.

"Federal Standard 1037C Telecommunications: Glossary of Telecommunication Terms," http://www.its.bldrdoc.gov/fs-1037, pp. 1-8, Aug. 7, 1996.

* cited by examiner

US 9,189,954 B2

ALTERNATE USER INTERFACES FOR MULTI TUNER RADIO DEVICE

RELATED APPLICATIONS

This application is a continuation of U.S. application Ser. No. 12/420,650 filed on Apr. 8, 2008, now U.S. Pat. No. 8,699,995, which claims the benefit of U.S. Application No. 61/043,604 filed on Apr. 9, 2008, each of which is incorporated herein by reference thereto.

FIELD OF INVENTION

This invention relates to radio systems and methods. In particular this invention relates to controlling a multi-tuner radio.

BACKGROUND OF THE INVENTION

The present invention is directed towards multi-tuner radio products and features, such as those illustratively disclosed in U.S. Pat. No. 7,171,174, issued Jan. 30, 2007, and U.S. Pat. No. 7,343,141, issued Mar. 11, 2008 and, which are hereby explicitly incorporated by reference herein in its entirety.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION

Figure 1A:
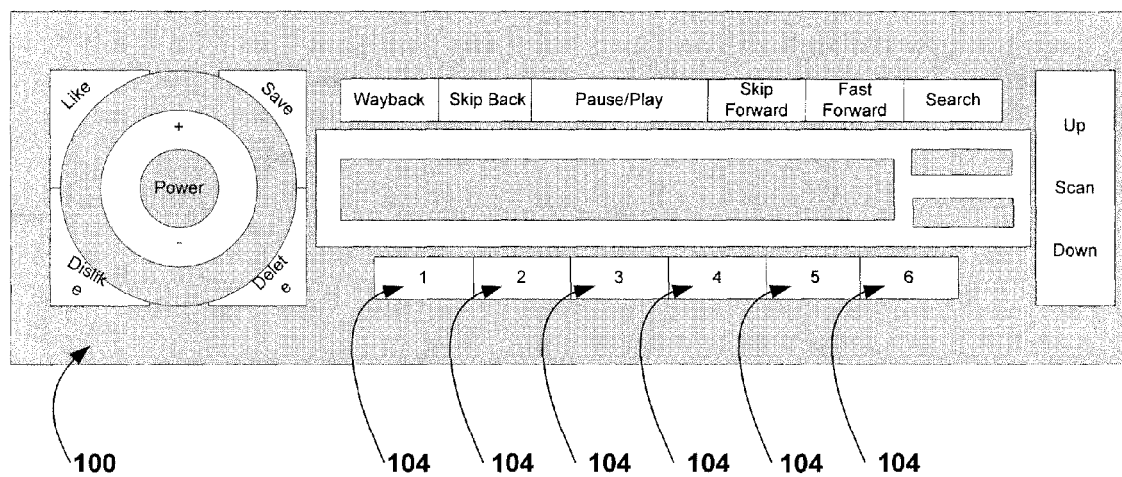
FIG. 1A illustrates an embodiment of a faceplate of a 3D Radio aftermarket car stereo system.

FIG. 1A illustrates an embodiment of a faceplate of a 3D Radio aftermarket car stereo system. This is an illustrative implementation, and other implementations are possible within the spirit of this invention. The look and feel may be altered, the names of the buttons may be changed, buttons may be added or removed, and other suitable alterations may be made. In addition, similar features may be used in products designed for other environments, such as home audio systems and portable music devices.

With further reference to FIG. 1A, the illustrated 3D Radio device supports six preset radio stations, generally designated by reference numeral 104. In one embodiment, user can set the radio stations to his/her favorite radio channels. Preferably, a plurality of preset radio stations can be supported. Radio system 100 can support at least six radio tuners, with one tuner devoted to each preset station. In one embodiment, radio system 100 may include eight radio tuners, one radio tuner corresponding to each of the 6 preset radio stations, one radio tuner to allow a station other than one of the favorite radio stations to be received at the same time as all of the presets, and one spare radio tuner to keep track of the most recently tuned station in order to allow continuous reception of that particular station.

The radio tuners can receive radio signals using a plurality of supported technology. These may include AM, FM, HD, satellite, Internet (e.g., using Wi-Fi), or other technology.

The device 100 can include adequate memory to buffer a predetermined amount of digitized and compressed audio for the received stations. For example, to be able to buffer one hour of audio from each of the eight stations, the device may include one-half gigabyte of internal memory. The device may include additional memory. For example, the device may include a total of 1 gigabyte of internal memory to allow one hour of storage per station plus an additional eight hours of storage for saved songs and other audio content. Memory may include memory chips or cartridges, (e.g., RAM, dynamic RAM, static RAM, programmable read-only memory (PROM), erasable programmable read-only memory (EPROM), flash memory, and other memory chips or cartridges), and any other medium to which a computer can write and from which a computer can read (such as a disk drive).

The device can include one or more processors, such as digital signal processors, and other circuits to compress the received audio information digitally and store it into the memory. The audio data may be stored, for example, in MP3 format. The processor can perform other tasks, such as controlling the audio output of the device and managing the user inputs and outputs.

In the present embodiment, the 3D Radio device 100 can continuously receive, compress, and store audio data from the eight tuners (e.g., each of the tuners) (six presets, current station, and previous station) into the memory device. The processor can continue to monitor the status of the memory device. When an hour of audio programming is available from any stored audio data, the oldest audio data may be overwritten, so that the most recent radio programming from the station is available for listening.

The 3D Radio may support connections to several external devices, for example:
  Music CD, CD ROM, DVD or digital audio player
  Flash drive over the USB port
  Flash memory (e.g., SD, CF or memory stick) device
  Mobile phone using Bluetooth or other wireless connection In accordance with one or more embodiments, a radio device able to receive multiple radio stations simultaneously (which is sometimes referred to herein as 3D Radio device) having different operational modes can be provided as illustrated by the examples below. The 3D Radio device may be in any of several operational modes. For example:
  Off. This is when the device is turned off, e.g., with the power button, or when the car has been turned off. All tuners continue to receive radio programming and the device continues to compress and store the received audio in its memory, but the display is turned off and the audio output ceases.
  On, normal radio play. When the device is turned on, the 3D Radio outputs audio from one of the radio stations. To play back, the audio is retrieved from memory, decompressed, converted to analog, and output. The audio may be played back immediately after it is compressed and stored, or it may be delayed by any amount of time up to the size of the audio memory buffer. In the example shown, the playback point may be at real time or may be delayed by any amount up to an hour.

On, radio paused. When the radio output is paused, the audio output is muted, and the storage of new audio data continues.

Saving radio. While playing radio or while 3D Radio is paused, the incoming audio data may be stored to a more permanent memory location, so that it will not be overwritten as the buffer fills. The radio station selected for output may be in saving mode, and one or more of the other stations not currently selected may also be in saving mode.

Saved content playback. In this mode, audio continues to be stored from all tuners. However, the output audio is taken from a stored audio file rather than from one of the radio content buffers. This stored content may be something that was previously received as radio programming, it may be something stored on a connected device such as a CD or flash memory card, or it may be any item of audio content that has been transferred from such a device to internal memory.

Playback of stored content paused. In this mode, audio playback from a stored content item has been temporarily stopped. Preferably, the content is retrieved from the internal memory of the device 100. Alternatively, it may have been retrieved from a connected device.

Phone. In the phone mode, the 3D Radio's microphone and speakers are used to support a phone call on a connected device (such as a Bluetooth mobile phone). Storage of audio data from all tuners continues, but playback has been paused.

Overlay. During any of these modes, a user feature may be initiated that requires using the display and buttons, but allows the audio to continue. In these cases, storage of radio programming continues on all stations, and playback of radio or stored content continues as begun prior to the overlay.

Each of the unselected radio station presets is in one of three modes:

Disabled. Before the user has programmed a preset, the associated tuner is disabled and no content is stored.

Normal. The playback point progresses along with the record point. The delay between the two remains the same as it was when the station was last selected for output.

Paused. The playback point does not progress. The delay between the playback point and the record point increases as additional content is buffered.

In accordance with one or more embodiments, a display can be provided as illustrated by the examples below. For example, a three-line LCD display, as shown, allows a variety of information to be presented to the user, depending on the mode. In general, the first line of the display contains information about the mode and source, while the second and third line contain more specific information about an item of audio content being played. For example:

In off mode, the display is blank.
When playing radio:
Line 1 includes:
The station preset number
The station frequency (if appropriate for the type of source) or channel number
The station call letters or name
A play icon to indicate play mode
A count of the time delay between the playback point and the record point for this station, in mm:ss format. This count does not change while playing back radio
If in save mode, the save icon is also displayed
Line 2 includes:
A thumbs-up icon if the artist of the item currently being played back has been designated as a favorite
A thumbs-down icon if the artist has been designated as a dislike
The name of the artist (if available)
May be the category of item (such as traffic, news, etc.)
May be the name of a radio show
For a commercial, may include the first of two lines of information about the product or service
Line 3 includes:
A thumbs-up icon if the item currently being played back has been designated as a favorite
A thumbs-down icon if the item has been designated as a dislike
The name of the item, or the second line of the name (if available)
For a commercial, may be the second line of information about the product or service
May present a call to action, such as "Press the phone button to buy tickets"
When radio is paused, the display is the same, except:
The pause icon is displayed instead of the play icon
The playback delay count increments every second
When playing back a saved item, the display is similar to the playback of radio programming, except:
The information about the radio station (present, frequency, station name) is replaced with information about the source (saved, CD, USB, etc.)
Time displayed is the playback offset from the start of the item, and increments every second
When playback of a stored item is paused, the display is the same except:
The pause icon is displayed instead of play
The playback offset does not change
In phone mode, the display shows:
Line 1 is phone icon and the phone number
Line 2 is the caller ID information, if available
Line 3 may show the connect time (minutes and seconds)
When in overlay mode, the display contents depend on the feature In accordance with one or more embodiments, mode and display changes can be provided as illustrated by the examples below. The following events can cause mode and display changes:

If a content item ends during normal radio play, the display is updated with any new information and normal play continues.

While in the radio pause mode, if the delay between the playback point and the record point reaches the size of the buffer, the 3D Radio resumes normal radio play mode, updating the display and commencing audio output at the maximum delay position.

If an unselected preset is in pause mode and reaches its maximum delay, the preset returns to normal mode, and the delay value for that station is set to zero.

If an unselected preset has a non-zero delay and it remains unselected for a time exceeding the size of the buffer, the delay is reset to zero.

If the playback of a saved item reaches the end of that item, the 3D Radio checks to see if there is another item stored in the same location, and begins playback of the next sequential item. After reaching the end of the last item in the location, the 3D Radio enters pause mode on playback of that item.

If information about a call-in opportunity is received in the radio signal while in normal radio mode and the playback delay is less than 30 seconds, the call-in information is displayed and will be used if the user presses the phone button.

If a phone call ends (either because the user hangs up or because the call was disconnected from the other end), the 3D Radio resumes the playback of the radio station or saved item that was interrupted by the call, using the playback point at the time of the commencement of the call.

If a content item ends (in the record stream) while in save mode, the 3D Radio completes writing the item to memory, and removes the save icon from the display. Playback continues without interruption.

In accordance with one or more embodiments, certain interactivity can be provided as illustrated by the examples below. The 3D Radio can respond to button presses, for example, as follows:

Power.
  If the device is off, turn on. Return to the most recent pause or play mode, either for the most recently selected radio station or for the most recently interrupted playback of a saved content item. Enable audio output and update the display appropriately.
  If the device is on, turn it off. Blank the display and disable the audio output. If in phone mode, exit. If in overlay mode, exit. Remember the current radio or saved content play/pause mode and delay or playback offset.
  While in off mode, all buttons other than the power button may be ignored.
Volume Up or Volume Down. Adjust the volume. This option is not active while audio is paused. The device may maintain separate volume levels for radio play, saved item playback (if desired, with different levels for playback from different sources), and phone. The volume level may be briefly displayed on line 3 of the display, temporarily replacing any other text.
Play/pause.
  If in play mode for radio or saved content, enter pause mode. If in pause mode enter play mode. Turn off/on audio and update the display.
  If in save mode, toggles between pause and play, but does not affect saving of content item.
  This button is ignored in phone mode.
  If in overlay mode, operation of this button depends on the specific function:
    If in the search feature, the current playback of radio or any saved content item is paused, the search feature is exited, and playback of the selected item commences at its beginning. The display is updated to reflect playback of the selected saved or radio item.
    If the play/pause button is pressed while other features are used in overlay mode, the current playback of radio or saved content pauses or resumes without updating the display.
Number keys (1-6):
  Six keys are shown in this example, but any suitable number of presets may be supported.
  While listening to radio, pressing and holding a number key for at least two seconds programs the button for the currently tuned station. The tuner associated with the specific preset is programmed to receive the station. Any buffered audio data stored for the station may be copied into buffer memory associated with the preset. Storing of audio data for the station into that buffer begins. In some implementations, tuners are not preassigned to preset numbers, but rather are assigned when the user programs the preset. In these implementations, the tuner may not need to be reprogrammed and the audio data may not need to be copied.
  Pressing a number key briefly will enter radio mode (if not already in radio mode), and either resume playback or pause state for the selected station. In some implementations, selecting a station that is paused will cause it to enter play mode at the previous delay offset. The display and audio output will be set as appropriate. If one of these buttons is pressed while in playback mode for a saved content item, that item may be paused, so that playback of that item can be resumed at the same point at a later time. This does not affect save mode.
  If in phone mode, these buttons may be ignored, or the number may be used to access telephone features.
  If in overlay mode, the function of these keys may depend on the specific feature:
    In the search feature, pressing a number key may change the search category to show content items in the buffer for the indicated radio station, and select the most recent content item in that buffer for display.
Way Back:
  In radio mode (pause or playback), sets the playback delay to the size of the buffer for the currently selected station and enters play mode. The display and audio output are updated appropriately.
  Does not affect save mode.
  In playback or pause mode for a saved item, restarts playback of the selected content item.
  Ignored in phone mode.
  For overlay modes:
    In search, updates the display to the earliest or first content item in the selected search category.
Now:
  In radio mode (pause or playback), sets the playback delay to zero for the currently selected station and enters play mode. The display and audio output are updated appropriately.
  Does not affect save mode.
  In playback or pause mode for a saved item, this button is ignored.
  Ignored in phone mode.
  For overlay modes:
    In search, updates the display to the latest or last content item in the selected search category.
Instant Replay:
  In radio pause mode, enters play mode and performs instant replay function.
  In radio play mode, skip back to the start of the song or commercial, if one is currently being played and its start can be identified (if less than one second from start of item, skip back to start of previous item). If not a song or commercial, skip back 15 seconds. Skip back to start of buffer if there is less that 15 seconds available. Does not affect save mode. Start playback at the new offset.

In recorded item playback or pause mode, skip back playback point by 15 seconds (or to start of item if less than 15 seconds from start) and start playback mode from that point.

Ignored in phone mode.

In overlay mode:
  Search:
    Selects previous item in search category and updates display.

Skip Forward:

In radio pause mode, enters play mode and performs skip forward function.

In radio play mode, skip to the end of the song or commercial, if one is currently being played and its end can be identified. If not a song or commercial, skip forward by 30 seconds. Set delay to zero if it is less than 30 seconds. Does not affect save mode. Start playback at the new offset.

In recorded item playback or pause mode, skip forward of playback point by 30 seconds and start playback mode from that point. Ignored if less than 30 seconds from end of item.

Ignored in phone mode.

In overlay mode:
  Search:
    Selects next item in search category and updates display.

Save:

If in radio play or pause mode, and the current playback point is in a song, show, or other content item that has already ended broadcast (playback delay is greater than the length of the item), copy the entire item from the station buffer to permanent storage and add title/track information, along with information about station and broadcast time.

If the item is still in progress, copy the portion of the item that has completed and enter save mode.

If in saved item playback mode or pause mode for an item in internal memory, this button is ignored unless a flash or other removable memory device is attached, in which case the item is copied to that device.

If in playback or pause mode for an item on CD or removable flash or other memory device, copy the item to local memory and store whatever information is available.

Ignored in phone mode. In some implementations, 3D Radio may save a recording of the phone conversation to internal memory.

If in search feature:
  If currently displayed title is in a radio station buffer, copy the item (if complete), or copy the portion that is complete and enter save mode for that station.
  If currently displayed title is on CD or flash memory, copy it to internal memory.
  If currently displayed title is in internal memory, copy the item to flash or other removable memory device if attached, or ignore this key if no external memory device is available.

Delete:
  Ignored if not in play/pause mode for a saved item in internal memory or search mode with such an item displayed. Deletes the indicated item from internal memory. In search mode, displays next item in category list, or top of next category list if category list becomes empty. If pressed while playing back or paused for a saved content item, enters pause mode once item has been deleted.

Search:
  Ignored in phone mode.
  If in pause or play mode for radio or saved item, enters search mode. Playback remains the same, but display enters overlay mode with search data. First non-empty search category from the following list is displayed:
    Saved—all saved content items in internal memory, sorted by date/time saved. First line of display: Search icon, save icon, followed by text "Saved content".
    Favorites—all content items marked as favorites, whether available in radio station buffers or saved content memory. Sorted by start time for content on radio stations, followed by saved content sorted by date/time saved. First line of display: Search icon, favorite icon, followed by text "Favorites".
    1-6—One category for each preset. Includes all content available in the station's buffer, sorted by broadcast time (item currently being broadcast is first, next most recent is second, etc.) First line of display: Search icon, present number, station frequency or channel number, and station name/call letters.
    One category for each currently available removable memory device (CD, USB flash drive, SD or other memory device), with items sorted as stored on the device. Track names displayed if available. First line of display: Search icon, the name of the device (e.g., "CD"), and the name of the album if available.
    Additional specific categories may be available, such as "Traffic" or "Weather", in which case all content with a matching category in any radio station buffer is included, sorted newest to oldest. First line: Search icon, followed by name of category.
    Other categories may be created dynamically based on availability. For example, if several songs by the same artist or from the same album have been stored, they may be grouped under a search category with that name.
  Display is configured as follows:
    Line one is the Search icon, followed by the specific name and/or icon associated with the category.
    Lines two and three are the specific information related to the content item (e.g., artist and track name).
  If Search button is pressed while in search feature, the next non-empty search category is selected, the first item in that category is found, and the display is updated.
  If the last Search category is already displayed when the Search button is pressed, the Search feature is exited and the display is updated based on the underlying play or pause mode.
  Search mode times out if there is no user input within two minutes.

Thumbs Up:
  In pause or play mode for radio or a saved item, or while in search mode, toggles the favorite status for the selected item. If already thumbs up, in some implementations this may toggle the favorite setting to remove the thumbs-up icon for the item, while in other implementations the thumbs-up button may be ignored if selected for an item that has already been marked as favorite. If marked as thumbs down, changes it to thumbs up. If neither, set it to thumbs up. Updates the display. Stores the new setting in memory so that matching content will be recognized as a favorite when it is seen later. In some implementations, multiple levels of preference may be specified, for example, zero to four thumbs up.

Ignored in phone mode. In some implementations, may add the phone number to a phone book.

Thumbs Down:
  In pause or play mode for radio or a saved item, or while in search mode, toggles the dislike status for the selected item. If already thumbs down, in some implementations this may toggle the dislike setting to remove the thumbs-down icon for the item, while in other implementations the thumbs-down button may be ignored if selected for an item that has already been marked as disliked. If marked as thumbs up, changes it to thumbs down. If neither, set it to thumbs down. Updates the display. Stores the new setting in memory so that matching content will be recognized as a dislike when it is seen later. In some implementations, multiple levels of dislike may be specified, for example, zero to four thumbs down.
  Ignored in phone mode.

Phone:
  If in radio or saved content play mode, pauses the playback
  If there is an incoming call, answers the call
    Caller ID should already be displayed
    Connect time can also be displayed for the duration of the call
  If the currently playing audio has embedded phone information, initiates a call to the indicated phone number.
    Shows caller ID and associated information on display
    Shows string "Dialing" until there is an answer, and then display connect time.
    May include an automatic redial number for busy signal
  If there is no phone number in the radio signal, allow the user to specify the number or phone book entry
    Supports voice recognition and dialing
    Allows use of phone keyboard
    Some implementations of 3D Radio may include all digits 0-9, and the 3D Radio buttons can be used to dial
    Display is updated while dialing and during call
  During a call:
    Hangs up the call
    Resumes playback mode for radio or saved content most recently selected Source:
  Selects the spare (e.g., seventh) tuner if not already selected
  Displays and selects one of the available audio sources.
  Pressing this button multiple times will toggle through the available sources. The first press does not change sources, just displays the name of the currently selected source.
  If on the last source, cycles back to the first.
  Clears the audio buffer for the station each time the source changes.

Supported sources may include:
    AM
    FM
    HD
    Satellite
    Internet
    Saved
    CD (shown if a CD is inserted)
    Flash (shown if a flash memory device is connected)
  Selecting Saved, CD, or flash does not require selecting and changing the tuner or clearing the audio buffer. Instead, it enters saved content playback mode for that device.
  Display of source name times out after five seconds, or when the user presses any other button.

Tune Up/Down:
  Selects the spare (e.g., seventh) tuner if not already selected
  Adjusts the frequency if appropriate for the type of source (e.g., AM or FM radio).
  Increments the channel number if appropriate for the type of source (e.g., Internet or satellite radio).
  Displays the frequency or channel number and the channel name if available.
  If on the highest (lowest) frequency/channel, cycles to lowest/highest.
  Clears the audio buffer for the station each time the frequency/channel changes.
  Tuning up and down while the Saved, CD, or flash source is selected jumps between tracks stored on that source (does not affect a tuner or clear any buffer).
  While in the search feature, these buttons may be used to select the next/previous content item in the selected category.

Scan:
  Enters or exits scan mode
  During scan mode, the word "Scan" is added to the first line of the display.
  Upon entering scan mode, all tuners are allocated to the scan feature.
  Each is tuned to the next consecutive available station on the currently selected source. For example, eight tuners are tuned to the eight stations on the selected source at the lowest frequencies. The first is selected for output.
  Every five seconds, the next tuner is selected and the one just deselected is tuned to the next available source. In some implementations, the tuner reassigned may be the one prior to the one just deselected, to allow the user to go back to that station and maintain its audio buffer.
  When the user exits scan mode, there will be, for example, 40 seconds of stored audio available to skip back and listen to.
  Pressing the play/pause button while scan is active pauses or resumes the scan (not the audio) and allows the user to listen to the current selection for longer. Scan pause mode may time out automatically to normal radio play mode if the user does not resume scan within one minute.
  Skip Forward while scan is active immediately advances the scan to the next station.
  Instant Replay while scan is active returns to the previous station in the scan, and puts the scan (but not the audio) into pause mode.

3DR:
- Allows the user to enable the "My3DR" feature.
- Personalized "radio station".
- The text "My3DR" is pre-pended to the first line of the display, along with information about the source of the content being played.
- Content is automatically selected from all available content sources. As each item ends, the next item is automatically selected and played, regardless of source.
- Radio content from all active presets is used, based on previous user Favorite selections.
- Preference is given to older content that will be overwritten sooner.
- Saved content is also used, on a "shuffle" basis.
- May be filled with radio content that is similar to that marked as favorites (e.g., same artist, link via a "similar to" database).
- May be further extended by content that has not been marked either favorite or dislike.
- All audio navigation features (Way Back, Instant Replay, Skip Forward, Now, Play/pause) are available while in the My3DR feature.

Audio (not shown):
- Enters overlay mode to allow the user to adjust various audio settings, while continuing to play radio or saved content. Pressing the Audio button multiple times may toggle between different adjustment features, such as bass, treble, balance, selecting equalizer settings, etc. While in the audio-adjust feature, the other buttons may be repurposed. The Volume Up/Down or Tune Up/Down buttons may be used to increase and decrease various settings dynamically. The number keys may be used, for example, to select from multiple equalizer presets. The display is used to guide the user through the settings. Pressing the Audio button while the final audio setting is displayed may exit the audio adjustment feature. The overlay mode display times out if there is no user input for one minute.

Previous Station (not shown):
- Pressing this button will enter radio mode (if not already in radio mode), and either resume playback or pause state for the most recently tuned station. This may involve selecting one of the six preset tuners, or it may involve selecting the spare tuner if the most recent station isn't a preset. If possible, this function is performed by selecting a previously tuned tuner rather than by changing a tuner setting, to allow the user the option of reviewing past audio on the station. The display and audio output will be set as appropriate. If in playback mode for a saved content item, that item may be paused, so that playback of that item can be resumed at the same point at a later time. This does not affect save mode. In some implementations, pressing the Previous button may allow the user to resume playback of a previously played saved item.
- If in phone mode, this button may be ignored.
- If in overlay mode, the function of this key may depend on the specific feature.

Setup/Menu (not shown):
- Enters overlay mode and allows access to various device setup and configuration options. While in setup, other keys such as the number keys and navigation keys may perform alternate functions, and the display may be used to guide the user through various operations. Pressing this key again may exit from the setup feature. Audio playback may continue normally while in the setup feature. If the user presses no keys for one minute while in the settings feature, overlay mode and the feature may time out.

Rewind, Fast Forward, Slow Play (not shown):
- Change the playback direction and/or speed of the current radio or saved content playback.
- May include frequency compensation.
- Includes the same rules about coming to the start or end of the content as during normal play and skip functions.

In accordance with one or more embodiments, certain external memory device related features can be provided as illustrated by the following examples. When an external memory device is connected, the 3D Radio may take any suitable action:

When a music CD is inserted, or a flash memory device is attached that contains music or other content:
- 3D Radio may begin playing the content automatically.
- The tracks may be automatically stored into internal memory if adequate space is available. In the case of a music CD, the format of the music may be changed (e.g., to MP3). Any associated information (e.g., artist and title) may be copied as well or retrieved from another location.
- The user may be given an option to save the content to internal memory.
- The tracks may be made available to the user for searching, saving, and playing directly from the device.

When a memory device with music information (artist, title, song signature, etc.) is connected:
- The information may be automatically copied into internal memory.
- The information may be made available for stored or broadcast music.
- The user may be given an option to save the data to internal memory.

When a memory device with a 3D Radio software update is attached:
- The update may be automatically installed.
- The user may be given an on-screen option to install the update.

While an external writeable memory device (e.g., flash drive) is attached:
- When saving a content item, the user may be given the option to save the item to the external memory rather than internal memory.
- The user may be given the option to store all user settings to the external memory device, and to load user settings from the external memory device if present.

Note in the above when mentioned is made to ignoring, it will be understood that the respective feature can be implemented without such ignoring if desired depending on the context of the usage of the term.

Figure 1B:
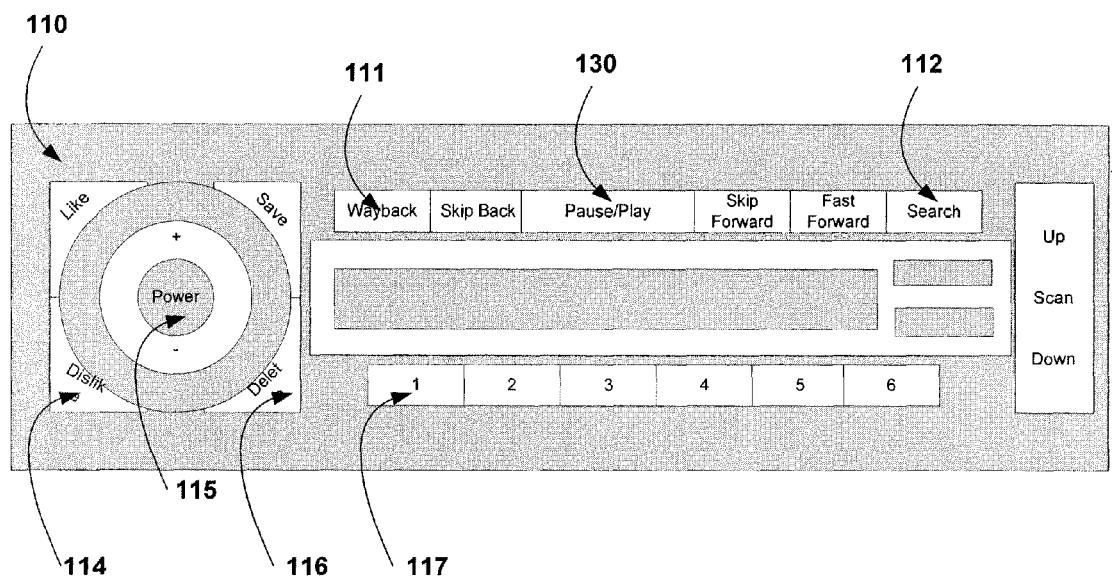
FIG. 1B illustrates an embodiment of a multi-tuner radio.
Figure 2:
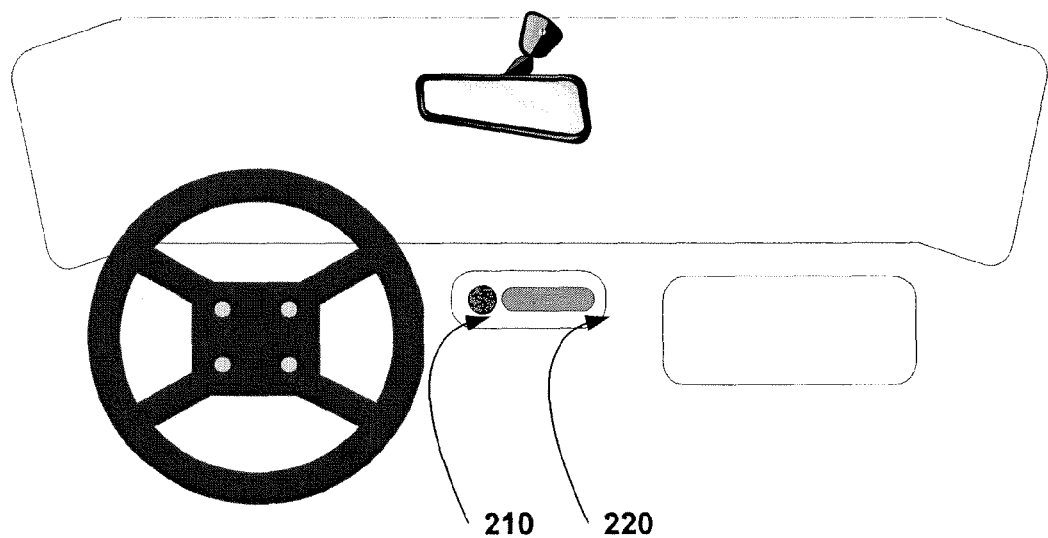
FIG. 2 shows an embodiment of a radio with button inputs installed in an automobile dashboard.
Figure 6:
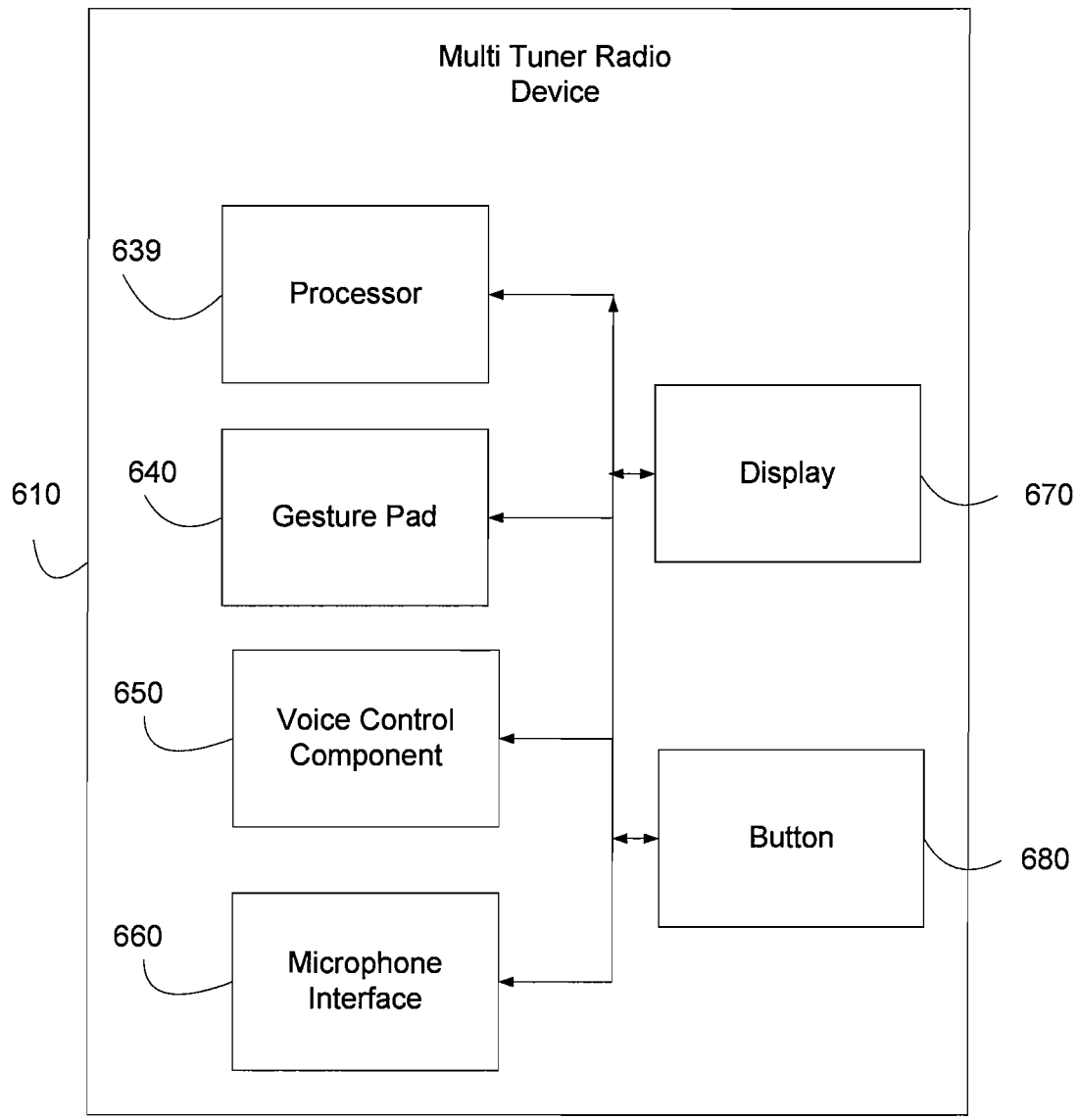
FIG. 6 shows an embodiment showing components of the multi-tuner radio.

FIG. 1B shows an embodiment of a multi-tuner radio with a particular user interface—physical buttons and an LCD or similar display. However, the present invention may provide an alternate or additional user interface. This may be useful, for example, when the number of command buttons gets to be large, or when it is important to be able to operate the radio without looking at its control panel (as for example while driving). FIG. 2 shows the radio 210 of FIG. 1B with button inputs installed in an automobile dashboard 220. FIG. 6 shows an embodiment showing components of the multi-tuner radio.

In one such embodiment, the radio device may support voice a control component 650. This embodiment may include a display 670 similar to 130 that is shown in FIG. A2.

It may also include at least one button 680 of FIG. 6 (e.g., 110-117 of FIG. A2), or alternatively a reduced number of buttons. For example, voice commands may be supported for common requests, and buttons may be present to support setup and other infrequent uses.

Figure 3:
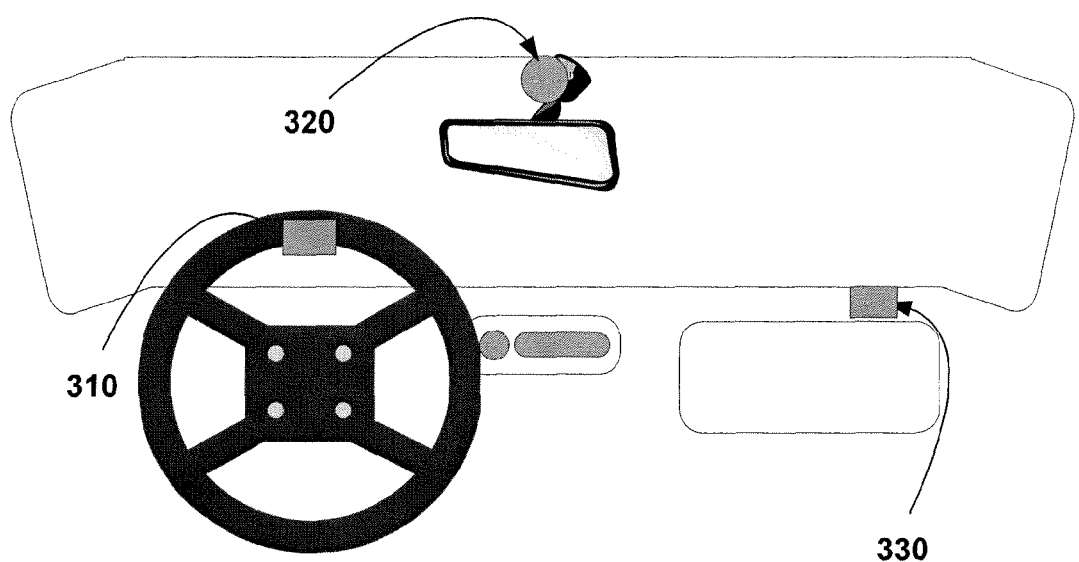
FIG. 3 shows an embodiment of a multi-tuner radio installed in an automobile dashboard and a plurality of microphones.

To support voice control, a microphone in communication with microphone interface 660 of FIG. 6 may be built into the radio device. Alternatively one or more microphones in communication with microphone interface 660 may be located remotely from the radio and may provide signals to the radio. For example, in a car radio embodiment, there may be a plurality of microphones. One microphone may be located to conveniently pick up voice commands from the driver (for example, on the steering wheel, sun visor, door frame, or rearview mirror). A second microphone may be located to conveniently pick up voice commands from a passenger (for example, on the door frame, sun visor, or dash). A third microphone may be located to pick up the output of the radio for analysis of the sound characteristics of the listening environment. To provide a cleaner voice signal, the radio device may use the raw audio output signal and the environmental microphone to determine a transformation function, and then use the inverse of that function to remove the radio's output from the command microphone. FIG. 3 shows a multi-tuner radio installed in an automobile dashboard, with three microphones. A microphone 310 designed to pick up voice commands from a driver is installed in the steering wheel. A microphone c30 designed to pick up voice commands from a front seat passenger is installed in the dashboard above the glove compartment. A third microphone 320 is installed on the rearview mirror to pick up general voice commands and to measure ambient sound levels and interference.

Figure 5:
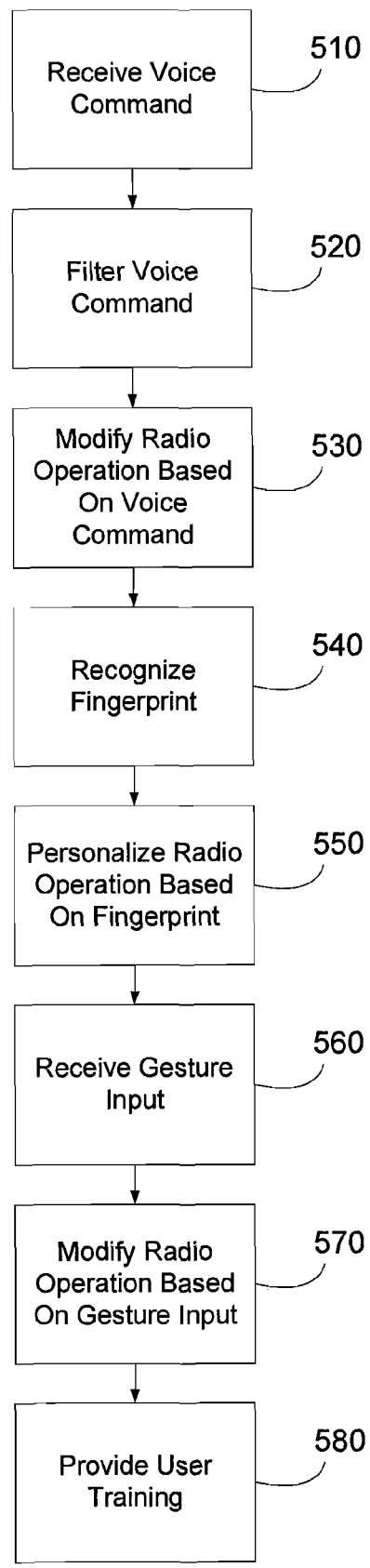
FIG. 5 shows a logical flow diagram of an illustrative embodiment for controlling a multi-tuner radio.

FIG. 5 shows a logical flow diagram of an illustrative embodiment for controlling a multi-tuner radio. Different configurations of operations may be used without departing from the scope of the invention. In one embodiment, the steps of FIG. 5 may be performed by processor 630.

At step 510, a voice command may be received. In one embodiment, the voice command may be received through microphone interface 660 and further processed by voice control component 650 and/or processor 630. In one embodiment, such as in a car or home radio, a microphone may be built into a remote control device. Voice commands may be given by speaking into the remote control. In some embodiments, such as with portable radios, a microphone may be built into the radio device itself.

At step 520, to provide a cleaner voice signal, the voice command may be filtered (e.g., by voice control component 650). In one embodiment, the radio device may use the raw audio output signal and the environmental microphone to determine a transformation function, and then use the inverse of that function to remove the radio's output from the command microphone.

At step 530, an operation of the radio may be modified based on the received voice command (e.g., using voice control component 650 and/or processor 630). In one embodiment, the radio may support a vocabulary of voice commands to navigate the radio's functions. The following table defines the set of voice commands, and associated function, for one embodiment:

| Voice Command | Function |
| --- | --- |
| On | Turn on radio |
| Off | Turn off radio (radio signals continue to be buffered while the radio is turned off) |
| Louder | Turn up volume |
| Softer | Turn down volume |
| Pause | Pause audio playback |
| Play | Resume audio playback |
| Continue | Same as "Play" |
| Skip | Skip forward by 30 seconds |
| Next | Skip to start of next song or other audio content item |
| Replay | Skip back 15 seconds |
| Restart | Go back to start of current song or other content item |
| Now | Jump to current broadcast point on currently selected radio station and start playback at that point |
| Way Back | Jump to earliest buffered content on currently selected radio station and start playback at that point |
| Station One | Switch to user's first programmed station preset |
| Station Two | Switch to user's second programmed station preset |
| Station Three | Switch to user's third programmed station preset |
| Station Four | Switch to user's fourth programmed station preset |
| Station Five | Switch to user's fifth programmed station preset |
| Station Six | Switch to user's sixth programmed station preset |
| Save Station One | Save station currently being output as station preset number one, where one is any assignable station preset number |
| Next Station | Switch to the next preset |
| Previous Station | Switch to previous preset |
| Input AM | Select AM radio as input source |
| Input FM | Select FM radio as input source |
| Input HD | Select HD radio as input source |
| Input Satellite | Select satellite radio as input source |
| Input Wi-Fi | Select Wi-Fi radio as input source |
| Input Saved | Select content items saved to internal memory for playback |
| Input CD | Select CD player as input source |
| Input MP3 Player | Select digital audio player as input source |
| Input iPod | Select a specific brand of digital audio player as input source |
| Input Flash | Select flash memory device as input source |
| Tune frequency | Tune to specified frequency, i.e., 88.5 FM |
| Tune Up | Tune to next available frequency or station on selected source |
| Tune Down | Tune to next lower available frequency or station on selected source |

| Voice Command | Function |
| --- | --- |
| Scan | Start a scan of available radio stations |
| Pause Scan | Temporarily pause scan, allowing listener to dwell on a particular station |
| Resume Scan | Continue scanning available stations after pausing |
| Scan Forward | Immediately advance scan to next station |
| Scan Back | Go back on station in scan sequence |
| Like | Indicate that audio content currently being output is a favorite of listener |
| Hate | Indicate that audio content currently being output is disliked by listener |
| Save | Save a copy of audio content item currently being output into internal memory or removable memory device |
| Delete | Delete selected audio content item from memory |
| Search | Begin search for audio content |
| Search category name | Search for audio content in specified category (such as station number, saved, CD, flash, favorites, traffic, weather, etc.) |
| Category | Select next search category |
| Next | Select next audio content item in selected search category |
| Play | Play selected audio content item |
| Fast Forward | Begin fast play of current output |
| Rewind | Begin reverse play of current output |
| My3DR | Select My3DR personalized radio station feature |
| Call In | Call number indicated by current audio content item |
| Dial phone number | Place phone call to indicated number |
| Answer | Pick up incoming phone call |
| Goodbye | Hang up phone |
| Last Station | Resume playing most recently output station |

At step 540, a fingerprint may be optionally recognized. In one embodiment, the fingerprint may be recognized using gesture pad 640. Some embodiments may include fingerprint identification and/or authorization, using technology similar to, for example, the Microsoft Fingerprint Reader. This may be used for authentication or other security purposes, to prevent an unauthorized person from using the radio. It may also be used to identify which finger is being used. In some embodiments, the fingerprint identification may be used to determine the orientation of the finger when it is pressed to the pad. At step 550, in some embodiments, the fingerprint identification may be used to determine which user is providing a command, and to provide a customized experience based on that identification (for example by providing individual user preferences).

At step 560, a gesture input may be received. In one embodiment, the gesture input may be received through gesture pad 640. In some embodiments, the multi-tuner radio may be controlled by a gesture pad (640). One example of a gesture pad that may be incorporated into the radio device is the Fingerworks iGesture Pad, which allows mouse-like input using multi-finger gestures. Another example is the touch screen used in Apple Computer's iPod devices, which incorporates a display screen into the input device.

The gesture input pad may be incorporated into the radio device or it may be located remotely. This input may replace the standard input keys, or it may supplement them. In some embodiments, common commands may be available using the gesture input pad, while infrequent commands, such as device setup commands, may require the use of physical keys. In some embodiments that use touch-screen technology, the need for physical keys may be eliminated by using soft keys—content-specific buttons drawn on the screen.

Figure 4:
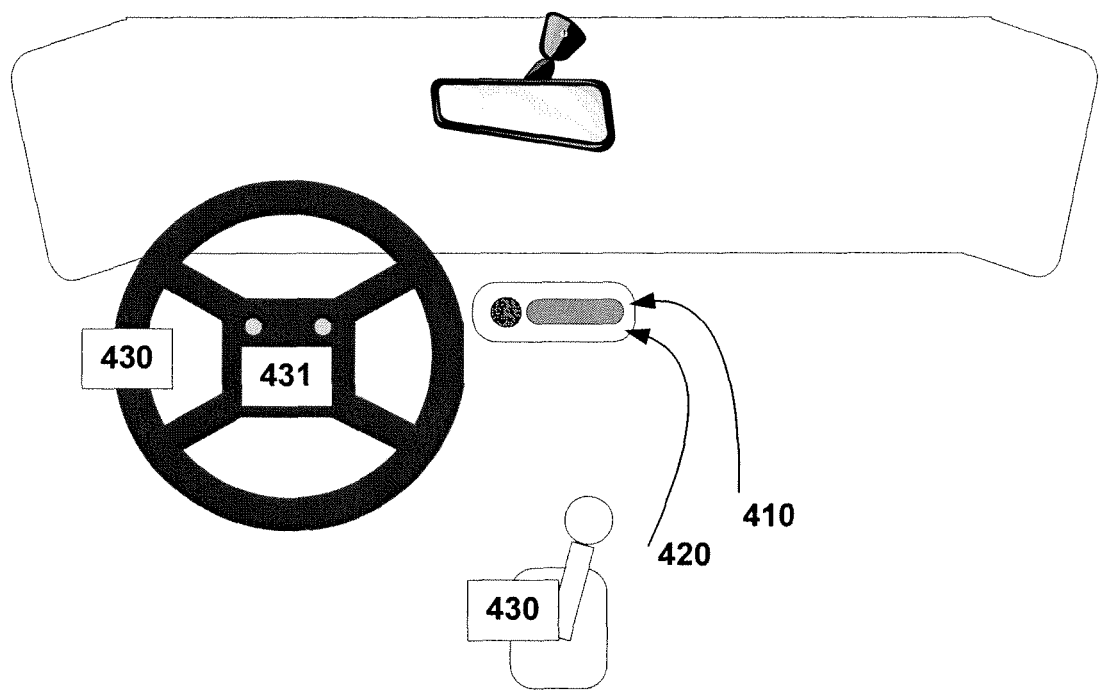
FIG. 4 shows an embodiment of a radio installed in an automobile dashboard and gesture pads for user input.

The gesture pad may be located at a plurality of locations. For example, in a car the gesture pad may be located on the steering column to provide easy access by the driver to common radio control commands without removing the hands from the steering wheel. In some embodiments, there may be two gesture pads on the steering wheel, one on each side. These two gesture pads may be used in some embodiments for different commands, while in other embodiments they may provide duplicate functionality. In some embodiments, multiple gesture pads may be provided to allow easy command input from different locations. For example, in a car one gesture pad may be located on the steering column for the driver, and a second gesture pad may be located on the dash for easy access by a passenger. An additional gesture pad may also be provided on a remote control device. FIG. 4 shows a radio 410 installed in an automobile dashboard 420 that uses gesture pads for user input. Two gesture pads d30-d31 are installed on the steering wheel for command input by the driver. A separate gesture pad d32 is located on a remote control device resting on the console.

In some embodiments, for example in a home or automobile environment, the gesture pad may be incorporated into a remote control device, which may use IR, UHF, Bluetooth, or other wireless or wired technology to communicate commands to the radio device. In some embodiments, the gesture pad may be incorporated directly into the radio device, as for example with a portable radio device. In some embodiments with multiple gesture pads, the system may determine which user is commanding the device based on which gesture pad is used for input. This may be used, for example, to provide separate preferences for different users.

Input commands on the gesture pad may be indicated by touching the pad and making a suitable gesture. In some cases, this may involve touching the pad with one finger. In some cases, two or more fingers may be used to create distinct commands.

Figure 7A:
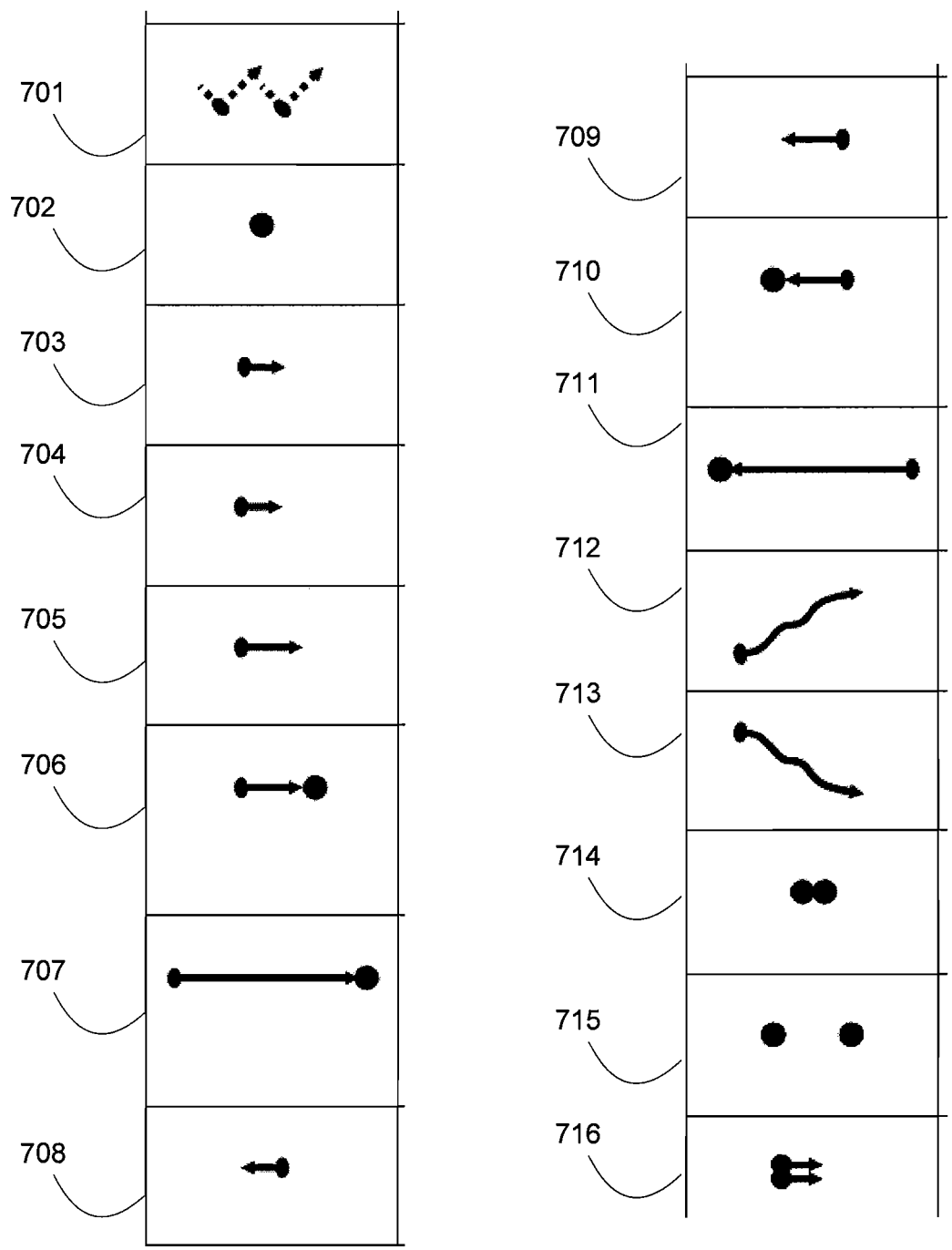
FIGS. 7A-7C show an embodiment showing components of the multi-tuner radio.
Figure 7B:
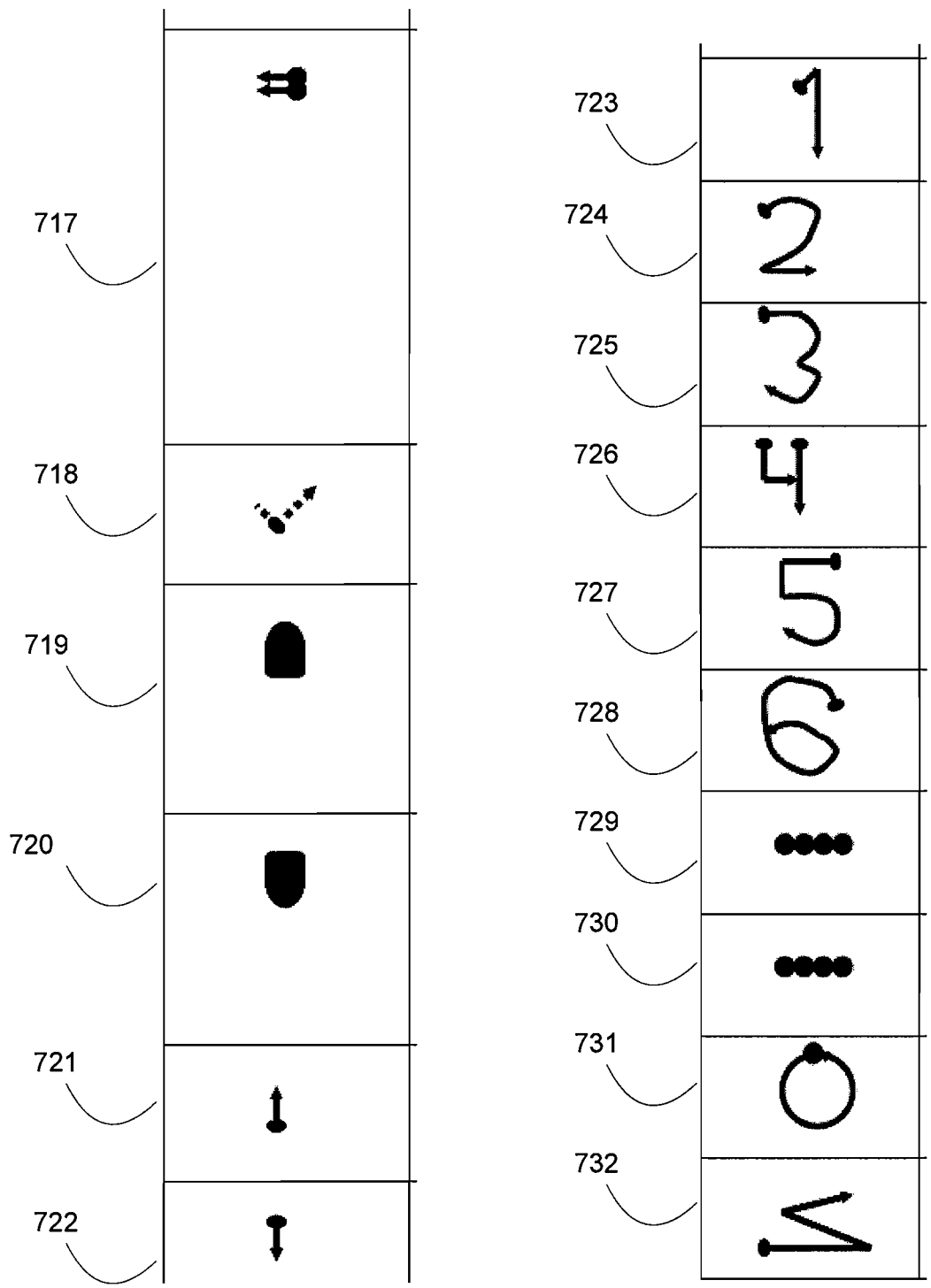
Figure 7C:
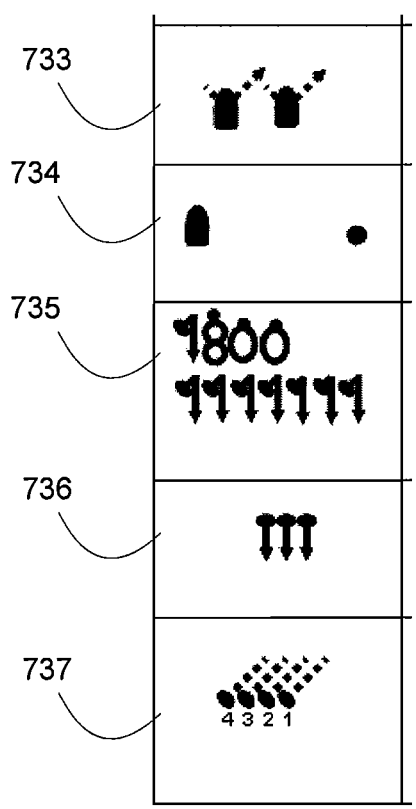

At step 570, an operation of the radio may be modified based on the received gesture input (e.g., using processor 630). FIGS. 7A-7C and the following table define a set of gesture, a description of the gesture, and an associated command for modifying the operation of the radio, in one embodiment:

| Gesture from FIGS. 7A-7C | Description | Command |
|---|---|---|
| 701 | Two quick taps with one finger | On |
| 702 | Press index finger firmly in center of pad | Pause |
| 703 | Quick short motion to the right with index finger | Play |
| 704 | Quick short motion to the right with index finger | Skip forward five seconds |
| 705 | Quick longer motion to the right with index finger | Skip forward 30 seconds |
| 706 | Quick longer motion to the right with index finger, followed immediately by a tap at the end | Skip to the end of song or audio content item |
| 707 | Stroke the entire width of the pad with index finger to the right with a tap at the end | Now |
| 708 | Quick short motion to the left with index finger | Skip back five seconds |
| 709 | Quick longer motion to the left with index finger | Skip back 30 seconds |
| 710 | Quick longer motion to the left with index finger, followed immediately by a tap at the end | Skip back to the start of song or audio content item |
| 711 | Stroke the entire width of the pad with index finger to the left with a tap at the end | Way Back |
| 712 | Wiggly stroke upward and to the right | Volume Up |
| 713 | Wiggly stroke downward and to the right | Volume Down |
| 714 | Press down with index and middle finger simultaneously and hold | Volume Up, volume increases while fingers are held in place |
| 715 | Press down with index and little finger simultaneously and hold | Volume Down, volume decreases while fingers are held in place |
| 716 | Quick short motion to the right with both index and middle finger | While playing, begins fast forward. While fast forwarding, increases speed of playback. While playing in reverse, decreases speed of playback |
| 717 | Quick short motion to the left with both index and middle finger | While playing, begins reverse play. While reverse playing, increases speed of reverse playback. While fast forwarding, decreases speed of playback |
| 718 | One quick tap with index finger | While fast forwarding or rewinding, returns to normal playback |
| 719 | Press thumb down firmly in upward orientation | Like—indicates an audio content item preferred by the listener. Orientation of thumb determined by fingerprint recognition. |
| 720 | Press thumb down firmly in the downward orientation | Hate—indicates an audio content item disliked by the listener. Orientation of thumb determined by fingerprint recognition. |
| 721 | Quick short upward motion with index finger | Select the next preset station for output |
| 722 | Quick short downward motion with index finger | Select the previous preset station for output |
| 723 | Draw the number "1" | Select preset favorite station one for output |
| 724 | Draw the number "2" | Select preset favorite station two for output |
| 725 | Draw the number "3" | Select preset favorite station three for output |
| 726 | Draw the number "4" | Select preset favorite station four for output |
| 727 | Draw the number "5" | Select preset favorite station five for output |
| 728 | Draw the number "6" | Select preset favorite station six for output |
| 729 | Press four fingers at once | Select saved content for playback |
| 730 | | Select digital audio player if connected |
| 731 | Draw a circle | Select the CD for playback |
| 732 | Draw a zigzag | Select shuffle playback mode |
| 733 | Two taps with thumbs in upward orientation | Select My3DR feature |

| Gesture from FIGS. 7A-7C | Description | Command |
|---|---|---|
| 734 | Press thumb, and little finger at once | Call, Answer, or Hang Up |
| 735 | Draw digits of phone number | Call the specified number |
| 736 | Quick short downward motion with three fingers | Save the current selection |
| 737 | Drum four fingers (e.g., pinky, ring, middle, and index fingers) in quick succession | Bring up soft-key function to allow access to full set of radio features |

At step 580, a user training may be optionally provided. In one embodiment, the user training may be provided using processor 630, gesture pad 640, and/or display 670. Some embodiments may use training to improve gesture recognition accuracy. This may be used to teach the device how hard the user presses down, how long the gesture strokes are, etc. In some embodiments, training may not be necessary. In some embodiments, the device may include a user training mode, in which the user is walked through various commands. This user training may include, for example, displaying the name of the command in text on the gesture pad, displaying the gesture on the pad graphically using dots, lines, and arcs, prompting the user to make the gesture him or herself, and providing the user with feedback as to how well the gesture was performed. In some embodiments, user identification may be performed based on characteristics of gesture input, which may be determined in a training session or may be determined or refined over normal use.

It is to be understood that other embodiments can be utilized and structural changes can be made without departing from the scope of the present invention.

What is claimed is:

1. A radio device comprising a gesture pad that receives a gesture input, that distinguishes between a plurality of fingers used for a gesture, that recognizes the orientation of the distinguished finger, and that performs a function that is dependent on the distinguished finger and its orientation.

2. The device of claim 1, further comprising a button input.

3. The device of claim 1, wherein the gesture pad comprises a touch screen.

4. The device of claim 3, wherein the touch screen is further configured to display a soft key for a function unassociated with a defined gesture.

5. The device of claim 1, further comprising a car radio, and wherein the gesture pad is located on a steering column in a car.

6. The device of claim 1, wherein the gesture input comprises one or more taps of the gesture pad.

7. The device of claim 1, wherein the gesture input comprises pressing against the gesture pad with a finger.

8. The device of claim 1, wherein the gesture input comprises a motion in a direction corresponding to a desired direction of audio control.

9. The device of claim 1, wherein the gesture input comprises a motion in a direction corresponding to a desired direction of audio control and a tap corresponding to a skip to an end of an audio buffer.

10. The device of claim 1, wherein the distinguished finger is a thumb, the distinguished orientation is up or down, and the gesture input comprises a thumb up or a thumb down to indicate a like or dislike for an audio content item.

11. The device of claim 1, wherein the gesture input comprises pressing with a thumb and a little finger to indicate a telephone operation.

12. The device of claim 4, wherein the gesture input comprises drumming of fingers to cause soft keys to be displayed.

13. A method for controlling a radio device, comprising:
receiving a gesture input through a gesture pad that distinguishes between a plurality of fingers used for a gesture, that recognizes the orientation of the distinguished finger, and that performs a function that is dependent on the distinguished finger and its orientation; and
modifying an operation of the radio device based on the received gesture input.

14. The method of claim 13, further comprising:
recognizing a fingerprint with the gesture pad;
authenticating a user based on the recognized fingerprint; and
personalizing the operation based on the fingerprint.

15. The method of claim 13, further comprising:
receiving a voice command;
filtering the voice command; and
modifying another operation of the radio device based on the voice command.

16. The method of claim 13, further comprising providing user training for gesture input.

17. The method of claim 13, wherein the gesture input comprises one or more taps of the gesture pad.

18. The method of claim 13, wherein the gesture input comprises pressing against the gesture pad with a finger.

19. The method of claim 13, wherein the gesture input comprises a motion in a direction corresponding to a desired direction of audio control.

20. The method of claim 13, wherein the gesture input comprises a motion in a direction corresponding to a desired direction of audio control and a tap corresponding to a skip to an end of an audio buffer.

21. The method of claim 13, wherein the distinguished finger is a thumb, the distinguished orientation is up or down, and the gesture input comprises a thumb up or a thumb down to indicate a like or dislike for an audio content item.

22. The method of claim 13, wherein the gesture input comprises pressing with a thumb and a little finger to indicate a telephone operation.

23. The method of claim 13, wherein the gesture input comprises drumming of fingers to cause soft keys to be displayed.

24. A system for controlling a radio device, comprising:
a gesture pad configured to modify an operation of the radio device, wherein the gesture pad distinguishes between a plurality of fingers used for a gesture, recognizes the orientation of the distinguished finger, and performs a function that is dependent on the distinguished finger and its orientation.

25. The system of claim 24, wherein the gesture pad comprises a touch screen.

26. The system of claim 24, further comprising a voice control component configured to modify a first operation of the radio device, wherein the first operation comprises one of:
- jumping to a current broadcast point;
- jumping to a point in a buffered content;
- indicating a preference for an output audio content of the radio;
- saving a copy of an audio content; or
- modifying an input signal type, wherein the input signal type comprises AM, FM, HD, Satellite, Wi-Fi, Saved, CD, MP3, iPod, or Flash.

27. The system of claim 24, wherein the distinguished finger is a thumb, the distinguished orientation is up or down, and the gesture input comprises a thumb up or a thumb down to indicate a like or dislike for an audio content item.

* * * * *